(12) United States Patent
Carnick et al.

(10) Patent No.: US 11,646,557 B2
(45) Date of Patent: May 9, 2023

(54) SWITCH BOX ASSEMBLY HAVING GUIDE FOR BUS BAR

(71) Applicant: Sumitomo Wiring Systems, Ltd., Yokkaichi (JP)

(72) Inventors: Brian Carnick, Farmington Hills, MI (US); Christopher Alexander, Farmington, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/485,756

(22) Filed: Sep. 27, 2021

(65) Prior Publication Data

US 2023/0097180 A1 Mar. 30, 2023

(51) Int. Cl.
*H02G 3/08* (2006.01)
*H02G 5/04* (2006.01)

(52) U.S. Cl.
CPC ............... *H02G 3/08* (2013.01); *H02G 5/04* (2013.01)

(58) Field of Classification Search
CPC ..................................................... H02G 3/08
See application file for complete search history.

(56) References Cited

U.S. PATENT DOCUMENTS

2014/0134891 A1* 5/2014 Yamada ................. H01R 13/42
439/709
2022/0157537 A1* 5/2022 Carnick .................... H02B 1/48

* cited by examiner

*Primary Examiner* — Hung V Ngo
(74) *Attorney, Agent, or Firm* — Honigman LLP (57) ABSTRACT

A switch box assembly is configured to house a switch box having a bus bar. The switch box assembly includes a holder, a nut housing and a guide. The holder includes a back wall. The back wall includes a slot for receiving the bus bar. The nut housing is configured to house a nut. The guide is disposed on the nut housing and adjacent the back wall, the guide dimensioned to guide the bus bar over a top surface of the nut. Accordingly, the guide prevents the bus bar from hitting the nut during installation.

16 Claims, 7 Drawing Sheets

SWITCH BOX ASSEMBLY HAVING GUIDE FOR BUS BAR

TECHNICAL FIELD

The disclosure relates to a switch box assembly. In particular the disclosure relates to a switch box assembly having a guide for guiding a bus bar.

BACKGROUND

Figure 1:
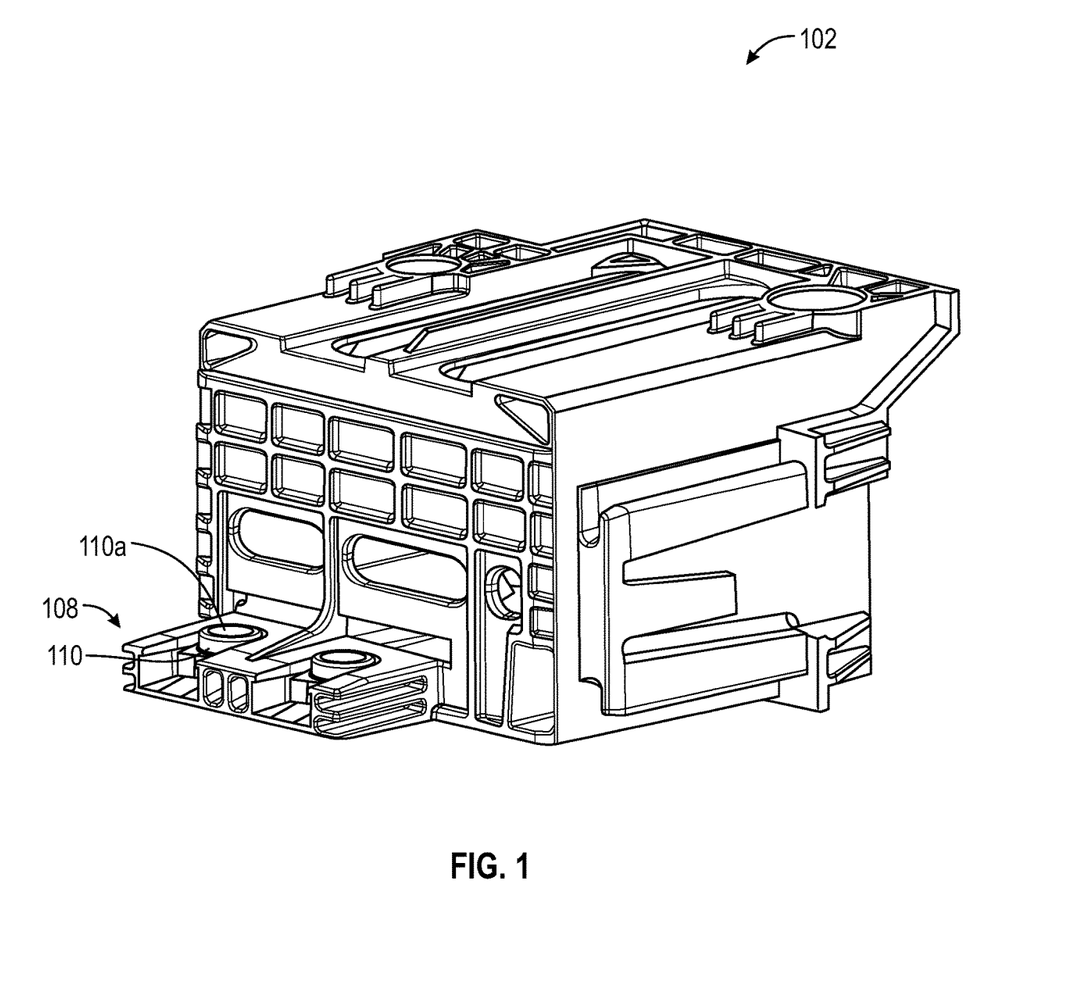
FIG. 1 is a perspective view of a conventional switch box assembly.
Figure 2:
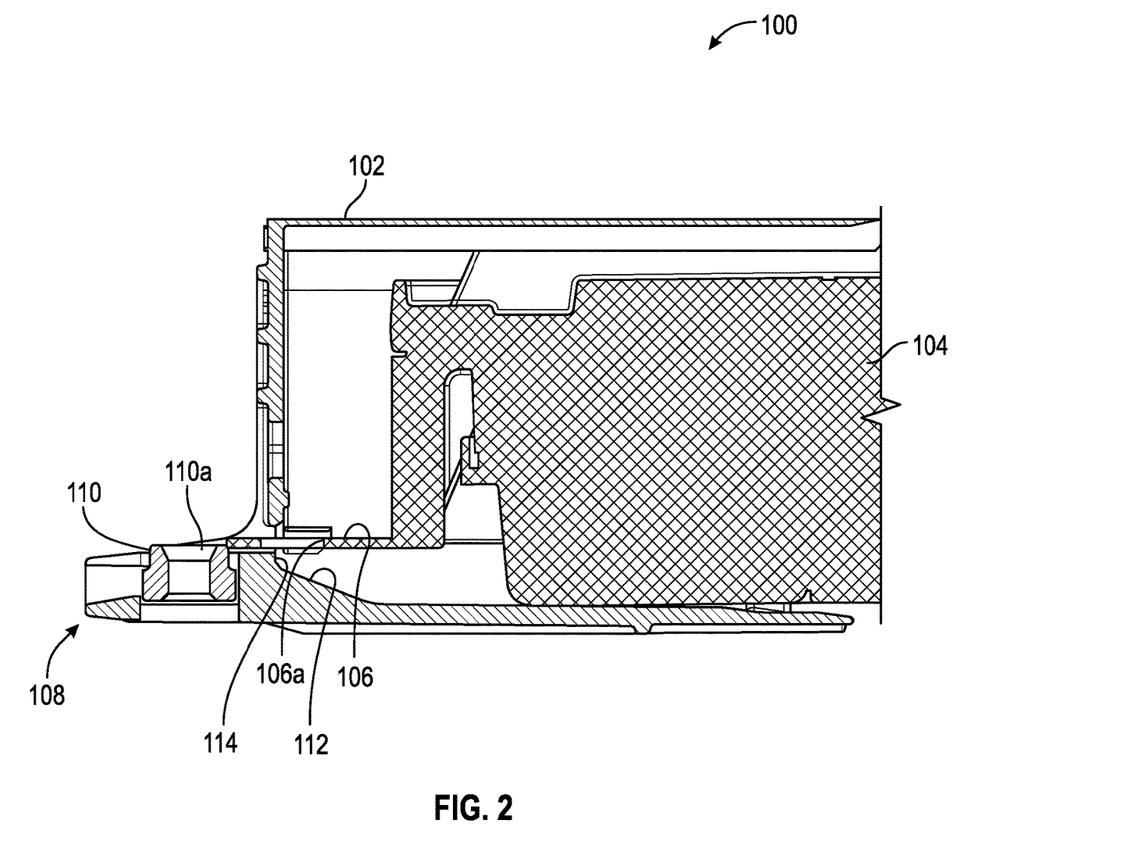
FIG. 2 is a cross-sectional view of the switch box assembly shown in FIG. 1 showing the switch box disposed within the holder.
Figure 3:
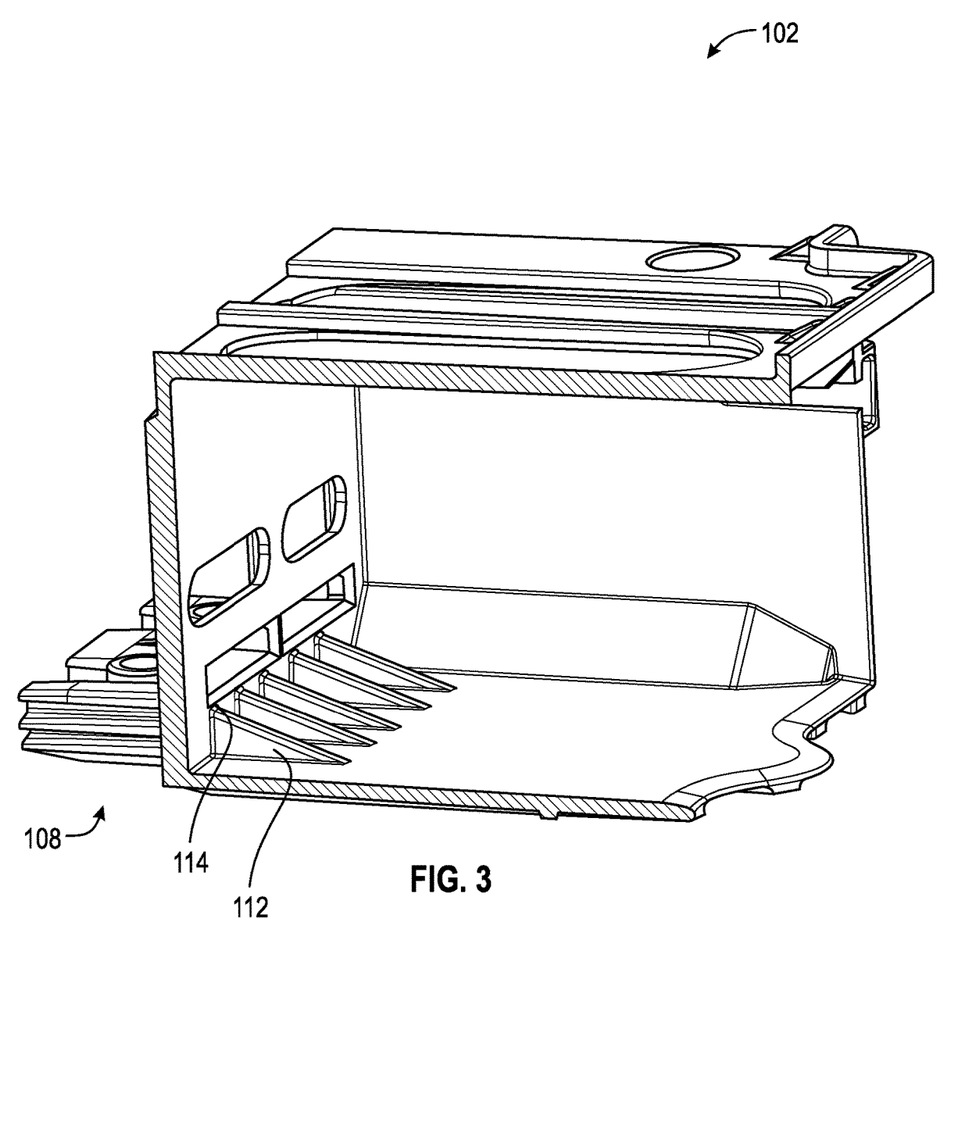
FIG. 3 is a perspective cross-sectional view of the holder shown in FIG. 2.

With reference first to FIGS. 1-3, an illustrative example of a conventional switch box assembly 100 is shown in FIGS. 1-3. Switch box assemblies are known for use in a junction box (not shown). The junction box may be incorporated into automotive vehicles. Junction box assemblies are configured to facilitate the distribution of power throughout various electric devices of the vehicle. The switch box assembly 100 includes a holder 102 and a switch box 104. The switch box 104 includes electric components for controlling the supply of power. The switch box 104 includes a bus bar 106 having a through hole 106a. The holder 102 is configured to hold the switch box 104 and mount the switch box 104 to the junction box. The switch box 104 is simply inserted into the holder 102.

The holder 102 includes a nut retaining portion 108. The nut retaining portion 108 is configured to hold a nut 110. When the switch box 104 is inserted, the bus bar 106 is dimensioned to register the through-hole 106a with the bore 110a of the nut 110. In such a manner, a bolt (not shown) may be inserted through the through-hole 106a of bus bar 106 and into the bore 110a of the nut 110 so as to secure the switch box 104 to the holder 102.

Due to manufacturing tolerances, a height of the nut 110 may extend beyond a top surface of the nut retaining portion 108. As such, there may be instances where the bus bar 106 hits against the protruding portion of the nut 110 as illustratively shown in FIG. 3. This may bend the bus bar 106.

Further, conventional switch box assemblies 100 may include a ramp 112 disposed within the holder 102. As shown in FIGS. 2 and 3, a top edge of the ramp is below a top surface of the nut retaining portion 108 of holder 102 so as to form an edge 114. Accordingly, the distal end of the bus bar 106 may also catch on the edge 114 which may in turn bend the bus bar 106.

Accordingly, it is desirable to have a switch box assembly configured to guide a switch box over the nut so as to prevent the bus bar from being accidentally damaged. It further remains desirable to have a switch box assembly which is configured to guide the switch box into a position to align the bus bar with the nut.

SUMMARY

In one embodiment of a switch box assembly, the switch box assembly is configured to house a switch box having a bus bar. The switch box assembly includes a holder, a nut housing and a guide. The holder includes a back wall. The back wall includes a slot for receiving the bus bar. The nut housing is configured to house a nut. The guide is disposed on the nut housing and adjacent the back wall, the guide dimensioned to guide the bus bar over a top surface of the nut.

In another aspect, the holder includes a pair of first side walls, a first top wall and a first bottom wall. The pair of first side walls, the first top wall and the first bottom wall connected to the back wall so as to define a switch opening for receiving the switch box.

In one aspect, the nut housing includes a second top wall spaced apart from a second bottom wall. The second top wall includes a U-shaped opening. The guide is disposed between a distal end of the U-shaped opening of the second top wall and the slot.

In another aspect, the holder further includes a ramp disposed on the first bottom wall and an inner surface of the back wall. A top portion of the ramp is contiguous with the slot.

In another aspect, the slot is defined by an angled edge. The angled edge coplanar with a top surface of the ramp so as to be contiguous with the top portion of the ramp.

In another aspect, the holder further includes a bead disposed on the first bottom wall. The bead is coaxial with a longitudinal length of the ramp. The bead extends from a distal end of the ramp to the switch opening.

In another aspect, the guide includes a slanted wall. The slanted wall faces the back wall and slot.

In another aspect, the guide is a truncated pyramid, wherein the slanted wall is coplanar with the top surface of the ramp and the angled edge so as to be contiguous with the top portion of the ramp and the angled edge.

In another embodiment, a switch box assembly includes a switch box and a holder. The switch box includes at least one bus bar. The holder includes a back wall. The back wall includes at least one slot for receiving a corresponding on of the at least one bus bar. The holder includes at least one nut housing, wherein each nut housing includes a nut. Each nut housing further includes a second top wall spaced apart from a second bottom wall. The second top wall including a U-shaped opening. The holder further includes at least one guide disposed on the nut housing so as to be adjacent the back wall of the holder. Each guide is dimensioned to guide a corresponding bus bar over a top surface of the nut. The guide is disposed between a distal end of the U-shaped opening of the second top wall and the slot.

In one aspect, the at least one bus bar is a pair of bus bars, the at least one slot is a pair of slots, the at least one nut housing is a pair of nut housings and the at least one guide is a pair of guides.

In one aspect, the holder includes a pair of first side walls, a first top wall and a first bottom wall, the pair of first side walls, the first top wall and the first bottom wall connected to the first back wall so as to define a switch opening for receiving the switch box.

In one aspect, the holder includes a pair of ramps disposed on the first bottom wall and an inner surface of the back wall. A top portion of each ramp is contiguous with a corresponding slot.

In one aspect, each slot is defined by an angled edge, the angled edge is coplanar with a top surface of a corresponding ramp so as to be contiguous with the top portion of the corresponding ramp.

In one aspect, the holder includes a pair of beads disposed on the first bottom wall. Each bead is coaxial with a longitudinal length of the corresponding ramp and extends from a distal end of the corresponding ramp to the switch opening.

In one aspect, each guide includes a slanted wall. The slanted wall faces the back wall and slot.

In one aspect, each guide is a truncated pyramid.

In one aspect, the slanted wall is coplanar with the top surface of the ramp and the angled edge so as to be contiguous with the top portion of the ramp and the angled edge.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed. Positional terms, such as "rear," "front," "left," "right," "up," "down," and derivative terms thereof are made in reference to the directions of the arrows provided in the accompanying figure.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring generally to the figures, embodiments of the present disclosure include a switch box assembly, the switch box assembly is configured to house a switch box having a bus bar. The switch box assembly includes a holder, a nut housing and a guide. The holder includes a back wall. The back wall includes a slot for receiving the bus bar. The nut housing is configured to house a nut. The guide is disposed on the nut housing and adjacent the back wall, the guide dimensioned to guide the bus bar over a top surface of the nut. Accordingly, the guide prevents the bus bar from hitting the nut during installation.

Figure 4:
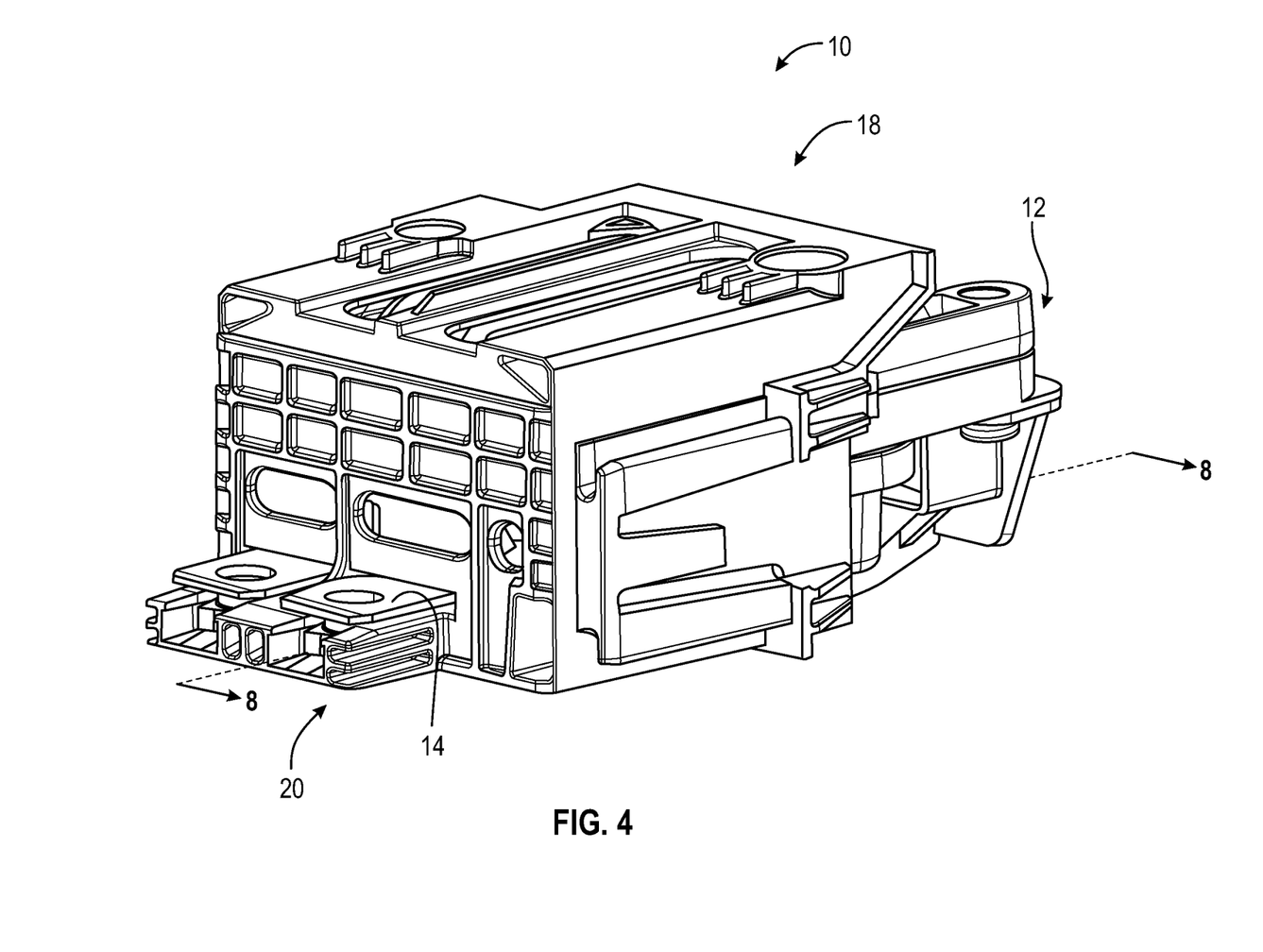
FIG. 4 is a perspective view of a switch box assembly according to one or more aspects illustrated herein.
Figure 5:
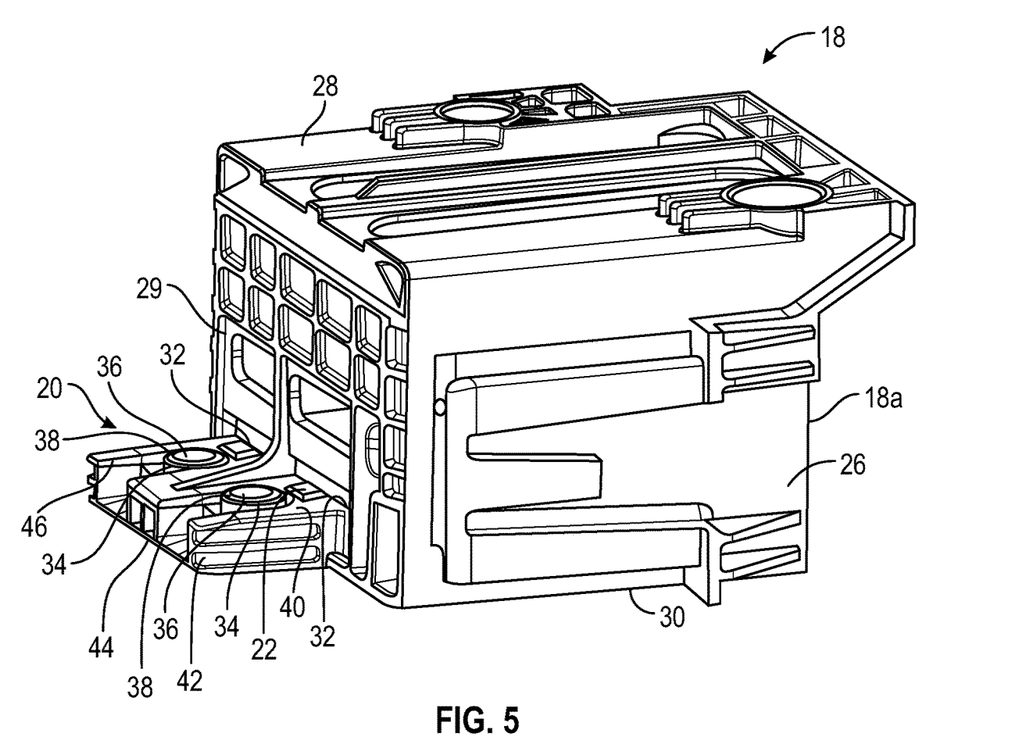
FIG. 5 is a perspective view of the holder shown in FIG. 4.
Figure 6:
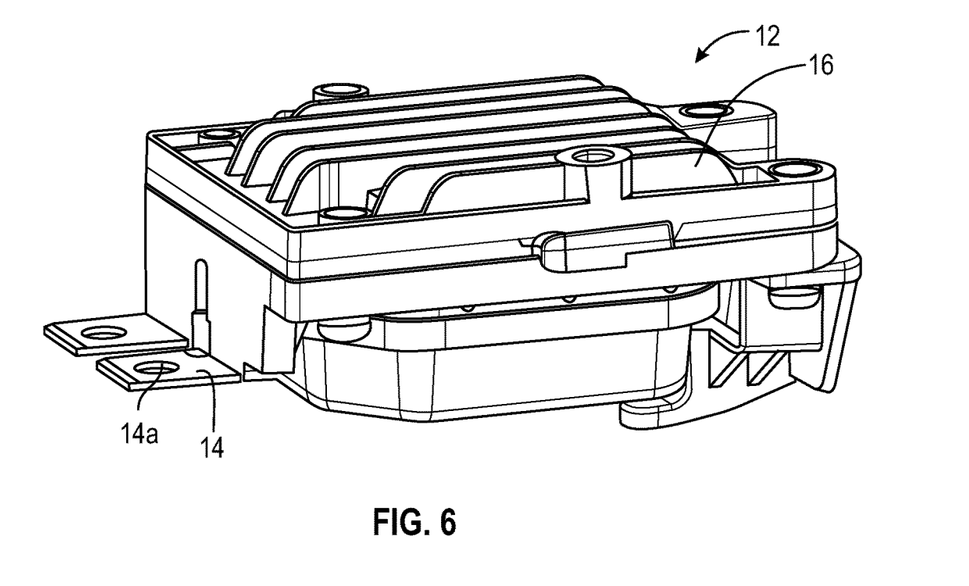
FIG. 6 is a perspective view of the switch box shown in FIG. 4.
Figure 7:
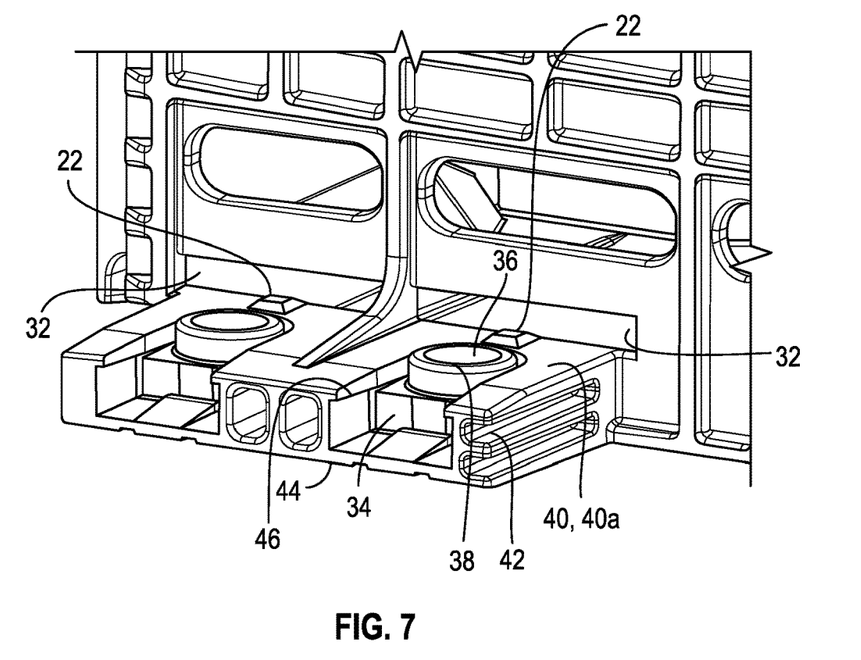
FIG. 7 is a close up view of FIG. 5 showing the nut housing.
Figure 8:
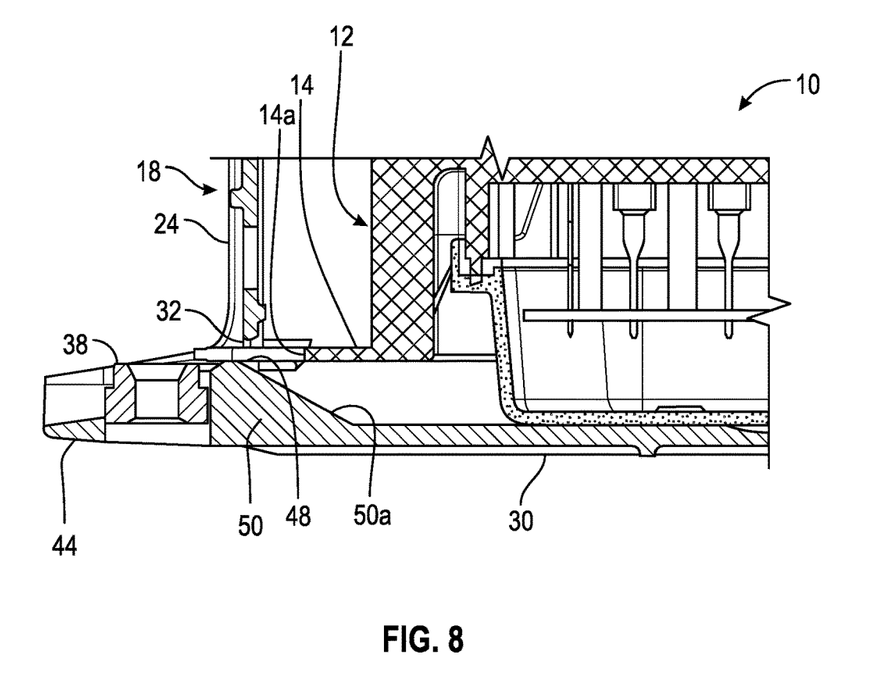
FIG. 8 is a close up cross-sectional view of the switch box assembly shown in FIG. 4, taken along line 8-8.
Figure 9:
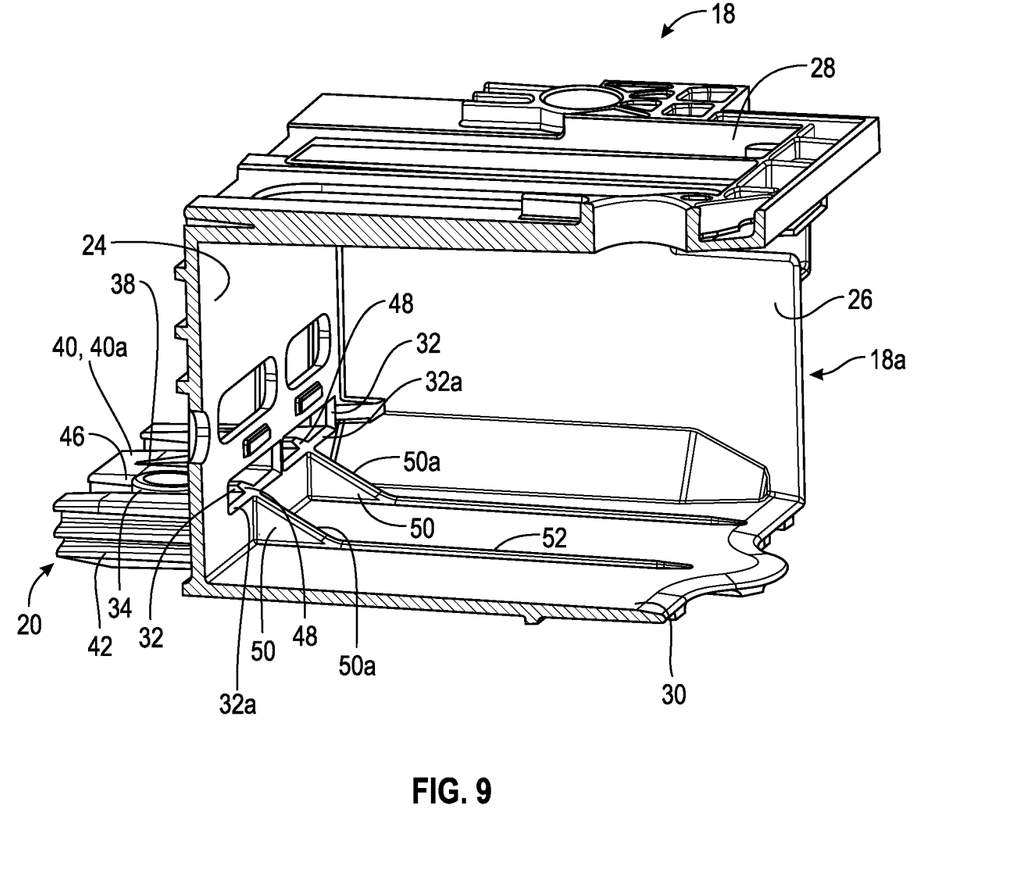
FIG. 9 is a perspective cross-sectional view of the holder shown in FIG. 8.

With reference now to FIGS. 4-6 an illustrative depiction of a switch box assembly 10 according to one or more aspects of the disclosure is provided. The switch box assembly 10 may be installed in various industrial platforms, illustratively including an automotive vehicle (not shown). The switch box assembly 10 is configured to house a switch box 12. The switch box 12 is configured to control electrical power or an electrical signal between a power source (not shown) and an electric device (not shown). The switch box 12 includes a bus bar 14 for receiving or supply electric power or an electric signal, as the case may be.

With reference now to FIG. 6, the switch box 12 is a generally cubital member. The switch box 12 is configured to house various electronic components for routing signals and power to various electric devices within the automotive vehicle (not shown). In one aspect, the switch box 12 is formed of a metal so as to tolerate a high temperature environment generated by the operation of a switch box 12.

The bus bar 14 is a planar member made of an electrically conductive material suitable for conducting electrical power to the switch box 12, any electrically conductive material currently known or later developed may be modified for use with the bus bar 14 described herein. The bus bar 14 includes a through-hole 14a for accommodating a bolt (not shown). The exterior surface of the switch box 12 may include heat dissipation fins 16. Each of the heat dissipation fins 16 is spaced apart from the other and extend along a longitudinal length of the switch box 12.

With reference now to FIG. 5, the switch box assembly 10 further includes a holder 18, a nut housing 20 and a guide 22. Preferably, the holder 18, nut housing 20 and guide 22 may be injection molded as a unitary piece. Preferably, the holder 18 is configured to receive the switch box 12 through a side of the holder 18. In one aspect, the holder 18 includes a back wall 24, a pair of first side walls 26, a first top wall 28 and a first bottom wall 30. The back wall 24, first side walls 26, first top wall 28 and first bottom wall 30 are generally planar members. The pair of first side walls 26, the first top wall 28 and the first bottom wall 30 connected to the back wall 24 so as to define a switch opening 18*a* for receiving the switch box 12 through a front end of the holder 18.

As stated above, the back wall 24 is a generally planar member defining a rear of the holder 18 which is opposite of the front of the holder 18. The back wall 24 includes a slot 32 for receiving the bus bar 14. The slot 32 is has a generally rectangular dimension configured to receive a width and a height of the bus bar 14. In one aspect, the slot 32 may be defined by an angled edge 32*a* disposed along a bottom portion of the slot 32.

The nut housing 20 is configured to house a nut 34. The nut 34 may be a cylindrical member mounted onto a cuboidal base. The cylindrical member includes a bore 36, preferably threaded, for receiving a bolt. The distal end of the cuboidal member of the nut 34 defines the top surface 38 of the nut 34. Any nut 34 currently known or later developed may be adopted and/or modified for use herein.

The nut housing 20 includes a second top wall 40, a pair of second side walls 42 and a second bottom wall 44 interconnected to each other to define the elongated cuboidal shape. The second top wall 40 includes a U-shaped opening 46. The U-shaped opening 46 is generally coplanar to a top surface 40*a* of the second top wall 40.

Preferably the nut 34 includes a threaded bore which is open to the opening 36 of the nut 34. The nut 34 is configured to secure an external bus bar 14 to the bus bar 14 by application of a threaded bolt, as will be described in greater detail below. The nut 34 includes a top surface 38 which is disposed on a plane which may be higher, or above, the plane defined by the top surface 38 of the second wall of the nut housing 20. Due to manufacturing tolerances the second top wall 40, second side walls 42 and the second bottom wall 44 may vary in thickness from one manufactured holder 18 to another. As such, the height of the top surface 38 of the nut 34 may vary with respect to the top surface 40*a* of the second wall from one manufactured holder 18 to another.

The guide 22 is disposed on the nut housing 20 and adjacent the first back wall 24 of the holder 18. The guide 22 is dimensioned to guide the bus bar 14 over a top surface 38 of the nut 34. In particular, the guide 22 has a height which is greater than a height of the nut 34 when the nut 34 is seated in the nut housing 20. The height of the guide 22 may be designed to include the manufacturing tolerance of the tool manufacturing the holder 18. As an example, if the manufacturing tolerance of the tool is 1.5 millimeters, the height may be increased by 1.5 millimeters. The holder 18 may be formed of a similar material or may be made of a material suitable for an injunction molding process illustratively including polypropylene, Acrylonitrile butadiene styrene, polyoxymethylene, polycarbonate and the like.

As shown in FIGS. 4, 5 and 7-9, the nut housing 20 projects outwardly from the back wall 24 of the holder 18. The guide 22 is disposed between a proximal end of the U-shaped opening 46 of the second top wall 40 and the slot 32 of the back wall 24. In one aspect, the guide 22 includes a slanted wall 48. The slanted wall 48 faces the back wall 24 and slot 32. In another aspect, the guide 22 is a truncated pyramid, wherein the distance between the frustum defines a height of the guide 22.

In another aspect, the holder 18 further includes a ramp 50 disposed on the first bottom wall 30 and an inner surface of the back wall 24. The ramp 50 is a generally planar member having a thickness which defines an upper edge 50*a*. The upper edge 50*a* is angled and inclines from the first bottom wall 30 to the slot 32. The upper edge 50*a* functions as a slide for which the switch box 12 and more particularly the bus bar 14 may engage.

A top portion of the ramp 50 is contiguous with the slot 32. That is the portion of the upper edge 50*a* which extends to the slot 32 forms a continuous and smooth surface. Accordingly, the angled edge 32*a* of the slot 32 is coplanar with a top surface of the upper edge 50*a* of the ramp 50 so as to be contiguous with the top portion the upper edge 50*a* of the ramp 50. Further, the slanted wall 48 is coplanar with the top surface of the ramp 50 and the angled edge 32*a* so as to be contiguous with the top portion of the ramp 50 and the angled edge 32*a*. Thus, the bus bar 14 is configured to slide along the upper edge 50*a*, onto the angled edge 32*a*, and subsequently the slanted wall 48 so as to be guided over the top surface 38 of the nut 34.

In another aspect, the holder 18 further includes a bead 52 disposed on the first bottom wall 30. The bead 52 is coaxial with a longitudinal length of the ramp 50. The bead 52 extends from a distal end of the ramp 50 to the switch opening 18*a*. The bead 52 may have an arcuate profile as take along a plane defining the width of the bead 52.

In a second embodiment, the switch box assembly 10 includes a switch box 12 and a holder 18. A description of the second embodiment will be made with reference to FIGS. 4-9. In the second embodiment, the switch box 12 includes at least one bus bar 14. In particular, the switch box 12 includes a pair of bus bars 14. For illustrative purposes, the bus bars 14 are generally identical to each other and may be coplanar with each other. However, it should be appreciated that the bus bars 14 may be shaped differently. For example one bus bar 14 may be wider than the other, while the other bus bar 14 is thinner.

The holder 18 may be constructed in a similar manner as the holder 18 in the first embodiment. Namely, the holder 18 includes a back wall 24. The back wall 24 includes at least one slot 32 for receiving a corresponding bus bar 14. In particular, the back wall 24 includes a pair of slots 32. Each of the slots 32 are shown to identical to the other as the bus bars 14 are identical. Accordingly, it should be appreciated that the slots 32 may be dimensioned differently so as to accommodate the shape of a respective bus bar 14. The slots 32 are disposed in a side-by-side relationship and are shown as being coplanar along both a width and a height of the back wall 24.

Likewise, the holder 18 includes at least one nut housing 20, wherein each nut housing 20 includes a nut 34. As the switch box 12 is illustratively shown as having a pair of bus bars 14, the holder 18 is shown as having a pair of nut housings 20. Each nut housing 20 includes a second top wall 40, a pair of second side walls 42 and a second bottom wall 44 interconnected to each other to define the elongated cuboidal shape. The second top wall 40 includes a U-shaped opening 46. The U-shaped opening 46 is generally coplanar to a top surface 40*a* of the second top wall 40. The nut housings 20 are disposed in a side-by-side relationship.

The holder 18 includes at least one guide 22. In particular, the holder 18 is shown as having a pair of guides 22. Each guide 22 is disposed on the nut housing 20 and adjacent the first back wall 24 of the holder 18. Each guide 22 is adjacent a respective slot 32. Each guide 22 is dimensioned to guide a corresponding bus bar 14 over a top surface 38 of a corresponding nut 34. In particular, each guide 22 has a height which is greater than a height of a corresponding nut 34 when seated in the nut housing 20. The height of the guide 22 may be designed to include the manufacturing tolerance of the tool manufacturing the holder 18. As an example, if the manufacturing tolerance of the tool is 1.5 millimeters, the height may be increased by 1.5 millimeters. Accordingly, as the bus bars 14 are shown as being the same dimension and shape and are positioned along the same place (with respect to a width and/or thickness of the back wall 24) the guides 22 are dimensioned similar to each other. However, it should be appreciated that one guide 22 may be bigger or smaller than the other based upon the position and size of the corresponding bus bar 14. The holder 18 may be formed of a similar material or may be made of a material suitable for an injunction molding process illustratively including polypropylene, Acrylonitrile butadiene styrene, polyoxymethylene, polycarbonate and the like.

As shown in FIGS. 4, 5 and 7-9, the nut housings 20 project outwardly from the back wall 24 of the holder 18. The each guide 22 is disposed between a proximal end of the corresponding U-shaped opening 46 of the second top wall 40 and the corresponding slot 32 of the back wall 24. In one aspect, each guide 22 includes a slanted wall 48. The slanted wall 48 faces the back wall 24 and slot 32. In another aspect, each guide 22 is a truncated pyramid, wherein the distance between the frustum defines a height of the guide 22.

In another aspect, the holder 18 further includes at least one ramp 50 disposed on the first bottom wall 30 and an inner surface of the back wall 24. In particular the holder 18 includes a pair of ramps 50. Each ramp 50 is a generally planar member having a thickness which defines an upper edge 50a. The upper edge 50a is angled and inclines from the first bottom wall 30 to a corresponding slot 32. The upper edge 50a functions as a slide for which the switch box 12 and more particularly the bus bar 14 may engage.

A top portion of the ramp 50 is contiguous with the slot 32. That is the portion of the upper edge 50a which extends to the slot 32 forms a continuous and smooth surface. Accordingly, the angled edge 32a of a respective slot 32 is coplanar with a top surface of the upper edge 50a of a respective ramp 50 so as to be contiguous with the top portion the upper edge 50a of the respective ramp 50. Further, the slanted wall 48 is coplanar with the top surface of the respective ramp 50 and the respective angled edge 32a so as to be contiguous with the top portion of the respective ramp 50 and the respective angled edge 32a. Thus, the bus bar 14 is configured to slide along respective the upper edge 50a, onto respective the angled edge 32a, and subsequently the respective slanted wall 48 so as to be guided over the top surface 38 of the respective nut 34.

In another aspect, the holder 18 further includes at least one bead 52 disposed on the bottom wall. In particular, the holder 18 includes a pair of bead 52s. Each bead 52 is coaxial with a longitudinal length of a corresponding ramp 50. Each bead 52 extends from a distal end of the corresponding ramp 50 to the switch opening 18a. Each bead 52 may have an arcuate profile as take along a plane defining the width of the bead 52.

In operation, the assembler inserts the switch box 12 into the switch opening 18a of the holder 18. The switch box 12 is inserted with the bus bars 14 leading the insertion. As the switch box 12 is inserted, the bottom surface of the switch box 12 slides along the beads 52 until the distal end of the bus bars 14 engage the upper edge 50a of the ramp 50, tilting the body of the switch box 12 upwardly. The distal end of the bus bars 14 slide along the upper edge 50a, then the angled edge 32a of the slot 32 and then the slanted wall 48 of the guide 22 wherein the bus bar 14 is positioned over the top surface 38 of the nut 34 so as to avoid hitting the nut 34. The switch box 12 is pushed into the holder 18 until the bus bars 14 extend over a respective nut 34, wherein the nut opening 18 and the through-hole 14a of the bus bars 14 are registered to each other. An external bus bar (not shown) which also has a through-hole, may be simply overlaid on top of the bus bars 14 and the bolt is then threaded into the threaded bore of a respective nut 34 so as to complete an electrical connection. Accordingly, the switch box assembly 10 provided herein helps prevent the bus bar 14 from being damaged during assembly.

While particular embodiments have been illustrated and described herein, it should be appreciated that various other changes and modifications may be made without departing from the spirit and scope of the claimed subject matter. Moreover, although various aspects of the claimed subject matter have been described herein, such aspects need not be realized in combination. It is therefore intended that the appended claims cover all such changes and modifications that are within the scope of the claimed subject matter.

We claim:

1. A switch box assembly configured to house a switch box having a bus bar, the switch box assembly comprising:
 a holder having a back wall, the back wall having a slot for receiving the bus bar;
 a nut housing for housing a nut; and
 a guide disposed on the nut housing and adjacent the back wall, the guide includes a slanted wall, the slanted wall facing the back wall and slot, the guide dimensioned to guide the bus bar over a top surface of the nut.

2. The switch box assembly as set forth in claim 1, wherein the holder includes a pair of first side walls, a first top wall and a first bottom wall, the pair of first side walls, the first top wall and the first bottom wall connected to the back wall so as to define a switch opening for receiving the switch box.

3. The switch box assembly as set forth in claim 2, further including a ramp disposed on the bottom wall and an inner surface of the back wall, a top portion of the ramp being contiguous with the slot.

4. The switch box assembly as set forth in claim 3, wherein the slot is defined by an angled edge, the angled edge coplanar with a top surface of the ramp so as to be contiguous with the top portion of the ramp.

5. The switch box assembly as set forth in claim 3, further including a bead disposed on the bottom wall, the bead coaxial with a longitudinal length of the ramp and extending from a distal end of the ramp to the switch opening.

6. The switch box assembly as set forth in claim 1, wherein the nut housing including a second top wall spaced apart from a second bottom wall, the second top wall including a U-shaped opening, wherein the guide is disposed between a distal end of the U-shaped opening of the second top wall and the slot.

7. The switch box assembly as set forth in claim 1, wherein the guide is a truncated pyramid.

8. The switch box assembly as set forth in claim 1, wherein the slanted wall is coplanar with the top surface of the ramp and the angled edge so as to be contiguous with the top portion of the ramp and the angled edge.

9. A switch box assembly comprising:
 a switch box having at least one bus bar;
 a holder having a back wall, the back wall having at least one slot for receiving a corresponding on of the at least one bus bar;
 at least one nut housing, each of the at least one nut housing having a nut, each of the least one nut housing including a second top wall spaced apart from a second bottom wall, the second top wall including a U-shaped opening; and at least one guide disposed on the nut housing and adjacent the back wall of the holder, each of the at least one guide includes a slanted wall, the slanted wall facing the back wall and slot and each of the at least one guide dimensioned to guide a corresponding one of the at least one bus bar over a top surface of the nut, the guide is disposed between a distal end of the U-shaped opening of the second top wall and the slot.

10. The switch box assembly as set forth in claim 9, wherein the at least one bus bar is a pair of bus bars, the at least one slot is a pair of slots, the at least one nut housing is a pair of nut housings and the at least one guide is a pair of guides.

11. The switch box assembly as set forth in claim 10, wherein the holder includes a pair of first side walls, a first top wall and a first bottom wall, the pair of first side walls, the first top wall and the first bottom wall connected to the back wall so as to define a switch opening for receiving the switch box.

12. The switch box assembly as set forth in claim 11, further including a pair of ramps disposed on the first bottom wall and an inner surface of the back wall, a top portion of each of the pair of ramps being contiguous with a corresponding one of the pair of slots.

13. The switch box assembly as set forth in claim 12, wherein each of the pair of slots is defined by an angled edge, the angled edge coplanar with a top surface of a corresponding one of the pair of ramps so as to be contiguous with the top portion of the corresponding one of the pair of ramps.

14. The switch box assembly as set forth in claim 13, further including a pair of beads disposed on the first bottom wall, each of the pair of beads coaxial with a longitudinal length of the corresponding one of the pair of ramps and extending from a distal end of the corresponding one of the pair of ramps to the switch opening.

15. The switch box assembly as set forth in claim 9, wherein each one of the at least one guide is a truncated pyramid.

16. The switch box assembly as set forth in claim 15, wherein the slanted wall is coplanar with the top surface of the ramp and the angled edge so as to be contiguous with the top portion of the ramp and the angled edge.

* * * * *